(12) United States Patent
Clarke

(10) Patent No.: US 7,090,800 B2
(45) Date of Patent: Aug. 15, 2006

(54) MOULD AND METHOD FOR INJECTION-COMPRESSION MOULDING

(75) Inventor: Peter Reginald Clarke, Petworth (GB)

(73) Assignee: Im-Pak Technologies Limited, Sussex (GB)

( * ) Notice: Subject to any disclaimer, the term of this patent is extended or adjusted under 35 U.S.C. 154(b) by 283 days.

(21) Appl. No.: 10/466,012

(22) PCT Filed: Jan. 25, 2002

(86) PCT No.: PCT/GB02/00306

§ 371 (c)(1),
(2), (4) Date: Jul. 9, 2003

(87) PCT Pub. No.: WO02/058909

PCT Pub. Date: Aug. 1, 2002

(65) Prior Publication Data

US 2004/0109919 A1    Jun. 10, 2004

(30) Foreign Application Priority Data

Jan. 26, 2001 (GB) ............... 0102026.2

(51) Int. Cl.
B29C 45/56 (2006.01)

(52) U.S. Cl. ............... 264/328.7; 264/328.8; 425/577; 425/590; 425/594

(58) Field of Classification Search ............ 264/328.8, 264/297.2, 328.19, 2.2, 328.1, 328.7; 425/590, 425/591, 594, 572, 588, 557–561
See application file for complete search history.

(56) References Cited

U.S. PATENT DOCUMENTS

| | | | | |
|---|---|---|---|---|
| 4,008,031 A | * | 2/1977 | Weber | 425/567 |
| 4,900,242 A | * | 2/1990 | Maus et al. | 425/149 |
| 5,658,522 A | | 8/1997 | Fischer | |
| 5,681,519 A | | 10/1997 | Kelman | |
| 5,792,392 A | * | 8/1998 | Maus et al. | 264/2.5 |
| 5,833,899 A | * | 11/1998 | Wunderlich | 264/40.4 |
| 6,045,740 A | * | 4/2000 | Gorlich | 264/297.2 |
| 6,440,351 B1 | * | 8/2002 | Saito et al. | 264/328.7 |

FOREIGN PATENT DOCUMENTS

| | | |
|---|---|---|
| EP | 0068614 | 1/1983 |
| EP | 0480456 | 4/1992 |
| EP | 0704290 | 4/1996 |
| EP | 0884146 | 12/1998 |
| FR | 2 792 244 | 10/2000 |
| FR | 2792244 | 10/2000 |
| GB | 1363322 | 8/1974 |
| GB | 2214125 | 8/1989 |
| JP | 63027219 | 2/1988 |
| WO | WO 98/21018 | 5/1998 |
| WO | WO 00/59705 | 10/2000 |

* cited by examiner

Primary Examiner—Jill L. Heitbrink
(74) Attorney, Agent, or Firm—Jon A. Gibbons; Fleit, Kain, Gibbons, Gutman, Bongini & Bianco P.L.

(57) ABSTRACT

A mold, a molding machine and a method of molding a plastics material in a mold cavity is described which relies primarily on movement of a part of the mold to provide the pressure necessary to force the plastics material melt to fill all the parts of the mold cavity. The method comprises the steps of applying a light pressure to close the mold, injecting a predetermined quantity of molten plastics material into the mold cavity at a pressure which is such that the injection of the plastics material can cause the cavity to expand in volume against the resistance of the light closing pressure, and applying a high pressure to close the mold fully after completion of the injection step.

21 Claims, 4 Drawing Sheets

MOULD AND METHOD FOR INJECTION-COMPRESSION MOULDING

CROSS REFERENCE TO RELATED APPLICATIONS

This application is based upon and claims priority from International Patent Application No. PCT/GB02/00306, filed Jan. 25, 2002, which is hereby incorporated by reference in its entirety. The International Patent claims priority from British Patent Application No. 0102026.2, filed Jan. 26, 2001, which is hereby incorporated by reference in its entirety.

BACKGROUND OF THE INVENTION

1. Field of the Invention The present invention relates to injection moulding of plastics material.

2. Description of Related Art

It is known that large, thin articles are difficult to form by injection moulding. The reason is that the gap between the two parts of the mould is small and the distance that the material has to travel is too long for the pressure applied by the moulding machine to be available at the far end of the gap from the injection point for driving the plastics to fill the mould. In short, the "flow path thickness ratio" is too long.

Conventionally, thin articles are formed by vacuum or pressure forming where a sheet of plastics material is stretched to conform to the shape of a mould. Such techniques are limited in their application as they cannot produce articles of even wall thickness or articles that have regions of increased or reduced wall thickness. This is because only one surface of the article is being moulded and the thickness at any point is determined exclusively by the thickness of the original sheet and the extent of its deformation.

The present invention seeks therefore to provide a method suitable for moulding an article of thin wall section in which all the surfaces of the article are defined by the wall surfaces of a mould cavity.

In its broadest aspect, the invention a method of moulding a plastics material in a mould cavity which relies primarily on movement of a part of the mould to provide the pressure necessary to force the plastics material melt to fill all the parts of the mould cavity, the method comprising the steps of:

applying a light pressure to close the mould, injecting a predetermined quantity of molten plastics material into the mould cavity at a pressure which is such that the injection of the plastics material can cause the cavity to expand in volume against the resistance of the light closing pressure, and applying a high pressure to close the mould fully after completion of the injection step.

The invention may broadly be regarded as applying to plastics material a technique similar to that used in metal forging. A quantity of molten plastics material is placed in the mould cavity while it is not at its minimum volume and plastics material is then compressed by fully closing the mould to force the plastics material into all parts of the mould cavity.

It is known to move part of a mould in order to apply additional compression after having injected a plastics melt into a mould cavity in the conventional manner. This process, which is known as injection compression moulding (ICM) offers advantages of longer flow lengths, thinner walls and a lower level of material stresses. This makes the process suitable for moulding such articles as CD's and DVD's (because of improved internal stresses) and vehicle body and instrument panels (because of improved impact resistance).

The known ICM process differs from the present invention in that the plastics melt is introduced into the mould under substantial pressure and during the injection of the plastics melt the mould parts are held together with sufficient force for the mould cavity to remain of constant volume during the injection. By contrast, in the present invention, the injection of the plastics melt can cause the mould parts to separate and the mould cavity to expand. The light pressure used to close the mould initially is intended primarily to exclude gas from the mould cavity. This is to avoid gas pockets being trapped in the cavity. As the melt is introduced into the mould, the cavity can expand as necessary so that the melt flows relatively freely to occupy part of the volume of the cavity. Once the predetermined quantity of molten plastics material has been introduced into the mould, the parts of the mould are brought together under high pressure to reduce the mould cavity to its final volume and force the melt to flow into all parts of the cavity.

It follows from the above explanation that the quantity of the plastics material needs to be predetermined because the injection cannot simply continue until the cavity is totally filled and the back pressure prevents further injection of the plastics material into the mould. In the prior art, on the other hand, injection is stopped by back pressure, at which time the plastics material may already occupy some ninety percent of the cavity. The final reduction in volume of the cavity is used only to force the partly solidified plastics material to flow into the last ten percent of the mould cavity.

In a typical embodiment of the present invention, the relative displacement of the mould parts under pressure is in excess of ten times the final mould thickness and may be as great as two hundred times the final moulding thickness. This is to be contrasted with a corresponding movement of some twice the final wall thickness, that is typically used in injection compression moulding.

A further important difference between the invention and conventional injection compression moulding resides in the speed of closing the mould and the rate of pressure increase within the mould cavity during the closing process. In the present invention, the mould is closed and maximum pressure is reached within the cavity within a period of less than 0.5 seconds and preferably less than 0.3 seconds. By contrast, in injection compression moulding, after the plastics material has been injected under pressure to fill a major part of the mould and cavity, the pressure is ramped up progressively to flow the plastics material to fill the remainder of the mould.

The most important difference however between the invention and earlier proposals resides in the application of a light pressure to close the mould while injection is taking place and a higher pressure to compress the injected plastics material after completion of the injection phase.

The relevance of this difference will be described by reference to the moulding of drinking cups, this being an example of an article to which the invention particularly lends itself. When forming a drinking cup, the plastics material is injected into the base of the cup and the application of high pressure to close the mould after completion of the injection step forces the plastics material to flow upwards from the base to form the side walls of the cup and any lip surrounding the mouth.

In such an application, it is essential to avoid gas being trapped in the bottom corners of the mould cavity at the junction between the base and the side walls. Compression of such gas raises its temperature and causes unacceptable burn marks in the finished products.

If the plastics material were injected into a fully open cavity, it would form a small sphere which would be flattened when the mould parts are brought together at high speed and would trap gas in the corners of the moulds. In the present invention, this is avoided because the injected plastics material does not form a sphere in the first place. Instead, the mould is closed or at least nearly closed under light pressure and the injected plastics material flows as a radially expanding disc which forces the mould parts apart if necessary until it totally fills the base of the cup. When the pressure is increased to force the injected plastics material up the side walls of the cup, there will be no gas trapped in the corners to cause burn marks.

It is important that the cavity volume should be fully contained at all stages after the commencement of injection of the plastics melt. Although the volume of the cavity must be variable, the melt must not be allowed to escape from the cavity.

To permit implementation of the method of the invention, the invention also provides in accordance with a second aspect, a mould for mounting between the platens of an injection moulding machine for injection compression moulding of a thin walled article, the mould comprising a first mould part, a core and a rim closure part surrounding the core, the three parts together defining a mould cavity and being movable relative to one another in the direction of opening and closing of the mould, wherein the rim closure part sealingly engages the first mould part and is in sealing sliding engagement with the core, movement of the core enabling the volume of the cavity to be varied while plastics material injected into the mould cavity remains fully contained.

In a further aspect, the invention provides a method of injection compression moulding a thin walled article using a mould as set forth above, which comprises the steps of moving the three parts of the mould towards their closed position in which they define a sealed cavity of variable volume, injecting a predetermined dose of plastics material into the cavity, the injection terminating after the cavity has been fully enclosed, the core being allowed to move away from the first mould part during the injection of plastics material into the cavity while offering a resistance lower than the force exerted by the material injected under pressure thereby enabling the cavity volume to increase to accommodate the volume of the injected dose, and forcing the core back into the first mould part to compress the injected plastics material and cause the material to flow into the parts of the mould cavity that define the thin walled sections of the finished article.

The mould is preferably provided with means for aligning the rim closure part relative to the first mould part in order to achieve accurate alignment of the movable core in relation to the remainder of the mould cavity.

A spring and/or a damper is preferably provided to resist movement of the core away from the first mould part.

In the preferred embodiment of the invention, a lost motion coupling is arranged in the line of force between the machine platen and the core. When the platen first moves in the direction to close the cavity, the core moves with it and the rim closure part closes the cavity. As plastics material is injected into the cavity, the presence of lost motion allows the core to move back towards the moving machine platen so that the cavity expands or at least the cavity does not continue to contract at the rate of movement of the platen. The lost motion is fully taken up by the time that the injection is completed and thereafter the core again moves with the platen to compress the cavity to its final minimum volume.

One can envisage an implementation of the invention using a moulding machine with a hydraulic lock (i.e. one that uses only hydraulic actuators to apply all the necessary pressure to the mould parts). Using such an approach, it is more difficult to achieve the necessary speed of closure of the mould cavity as well as the rapid rise in pressure that is needed as the mould parts approach their closed position. This may therefore require the use of purpose built machines. In this respect, it should be noted that the plastics material is cooled and sets as it makes contact with the mould surfaces and it vital for this reason that the flowing of the plastics material by the closing of the mould parts should be completed as quickly as possible. An injection moulding machine with a toggle closure mechanism has however been found to be well adapted to provide the substantial force require to effect the final closure.

Since the pressure in the plastics material on final closure is substantial, the injection gate through which the plastics material is injected into the mould is preferably closed by a valve prior to final mould closure. This is to avoid expulsion of material from the tool during final closure.

Preferably, the closure of the mould under high pressure involves reduction of the mould part gap over a substantial portion of the surface area of the finish formed article, whereby movement of the plastics material through a thin mould part, which might otherwise be regarded as too thin, occurs only during the last part of the final closure.

In order to introduce an accurately predetermined quantity of molten plastics material, it is preferred to provide a hot-runner system that comprises a manifold incorporating a dosing cylinder for each of the cavities, each dosing cylinder being connected to a common pressurised supply of molten plastics material by way of a respective valve and being connected to the associated cavity by way of a gate valve.

Each dosing cylinder comprises a variable volume chamber bounded by a piston which acts to store the required dose of plastics material for its associated cavity. When the plastics material is injected from the pressure source into the dosing cylinders, it will first flow to the dosing cylinder offering the least resistance but when this pot is full the plastics material will meet resistance and will be diverted to another of the dosing cylinders until all the dosing cylinders are full. An adjustable stop may be provided for each of the pistons of the dosing cylinders to allow fine adjustment of the quantity of plastics material delivered to each cavity. When the gate valves are opened and the pistons of the dosing cylinders are moved in a direction to reduce the volume of the working chambers, the stored plastics material is forced past the gate valve into the cavity and is prevented from moving in the opposite direction.

The invention will now be described further, by way of example, with reference to the accompanying drawings, in which.

Figure 1:
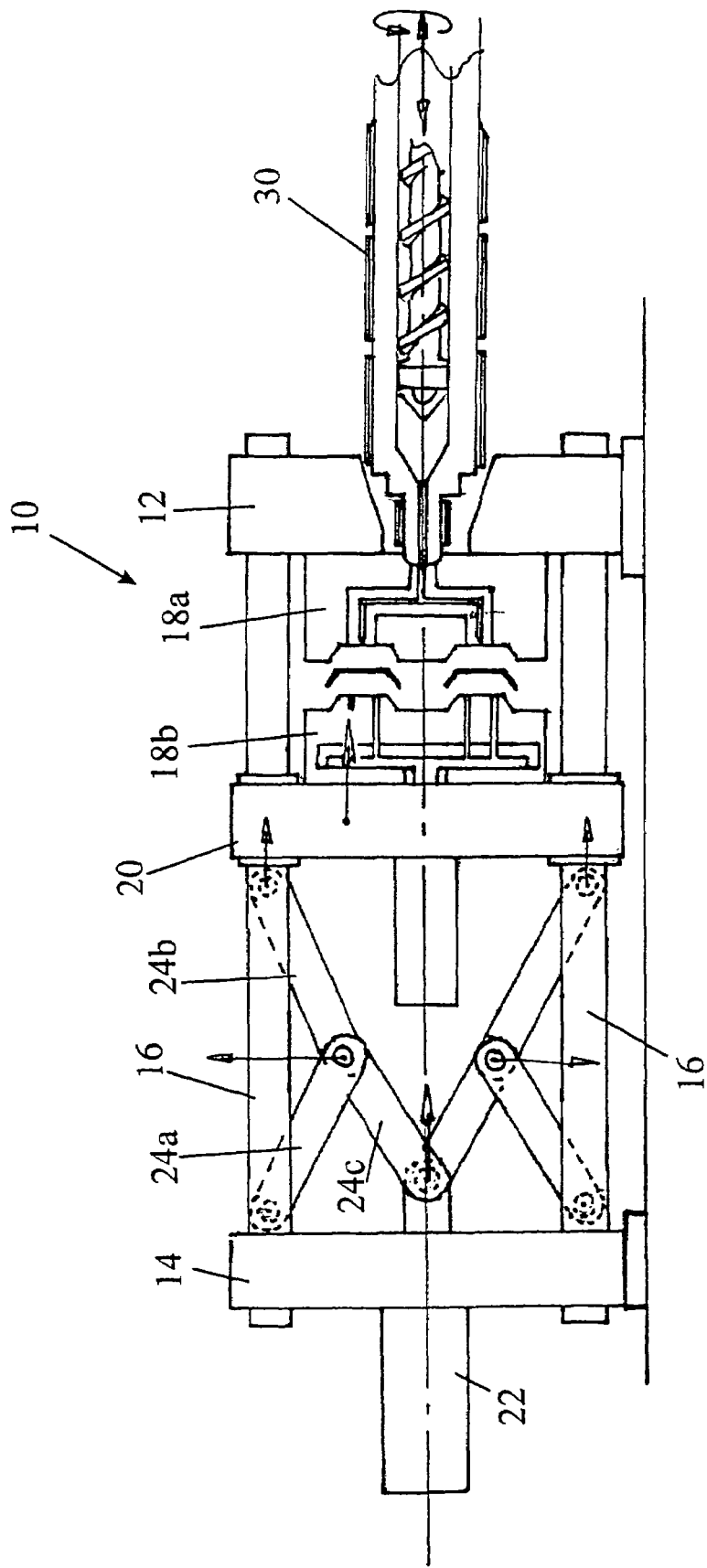
FIG. 1 is a schematic representation of a conventional moulding machine.
Figure 3:
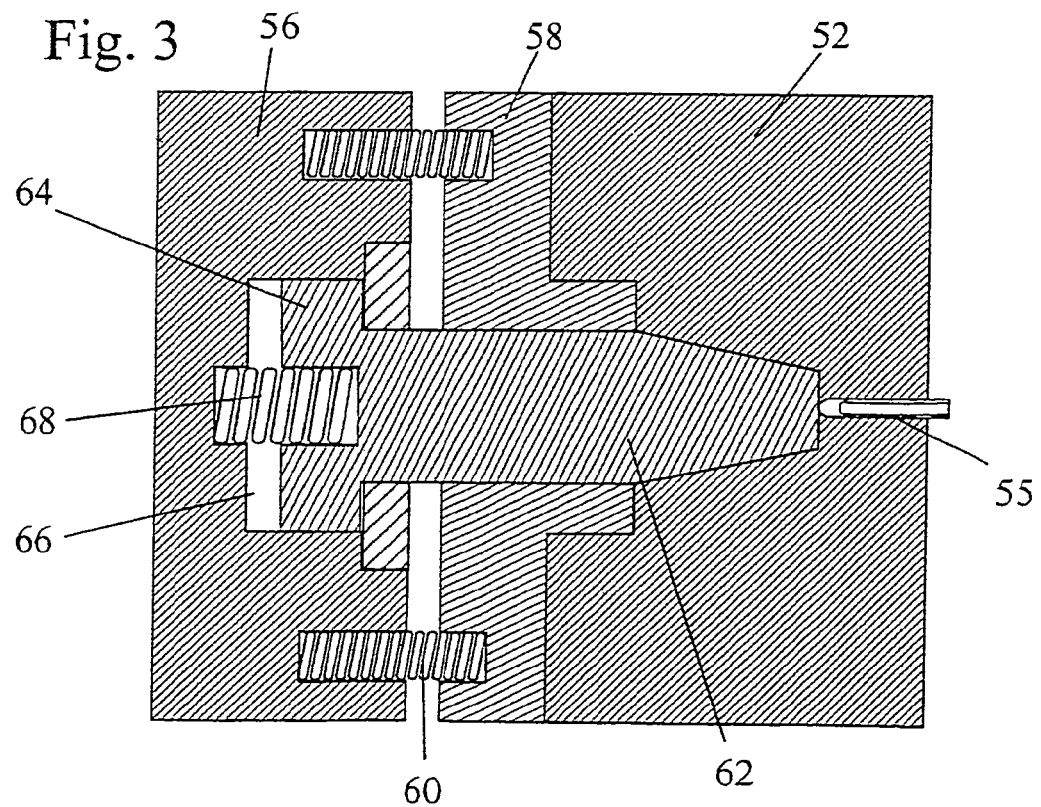
Figure 4:
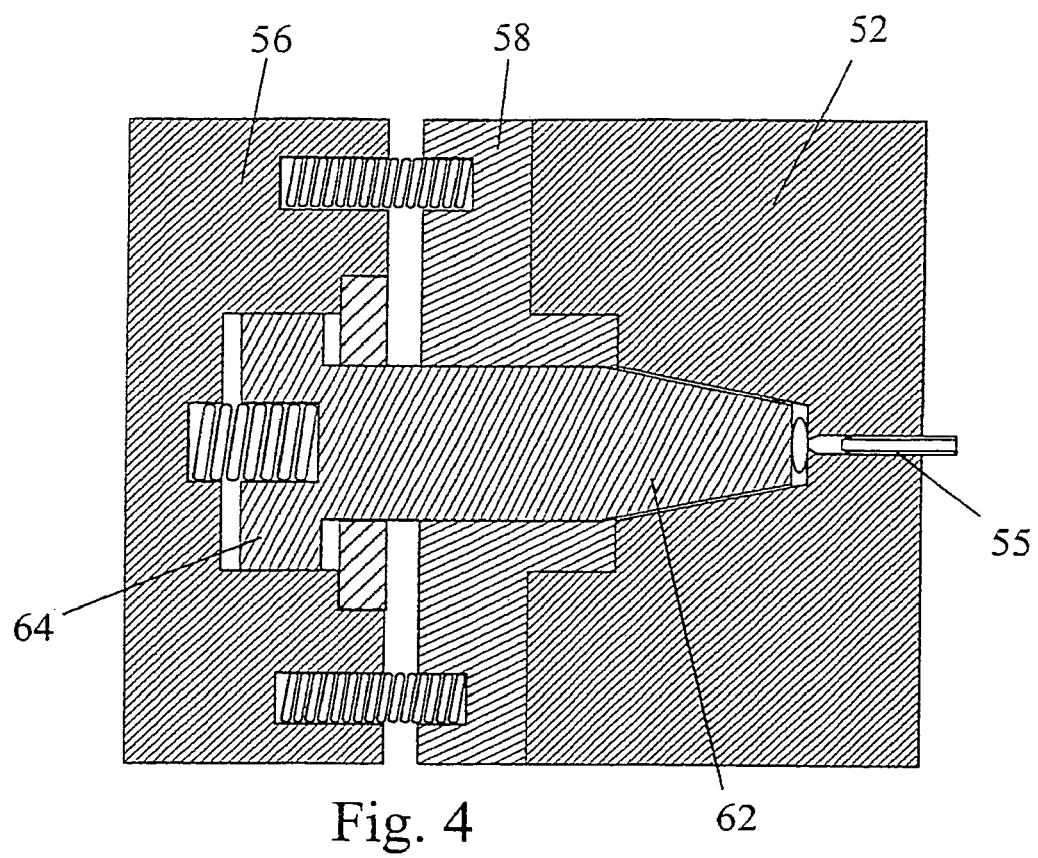
Figure 5:
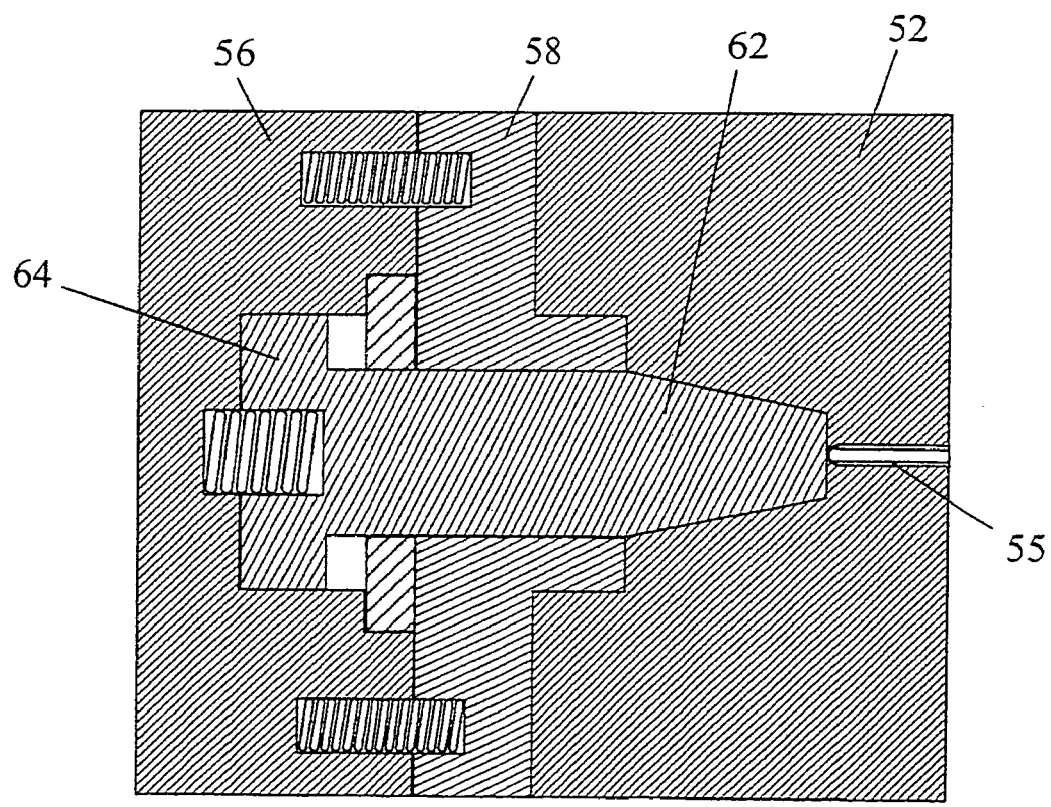
Figure 6:
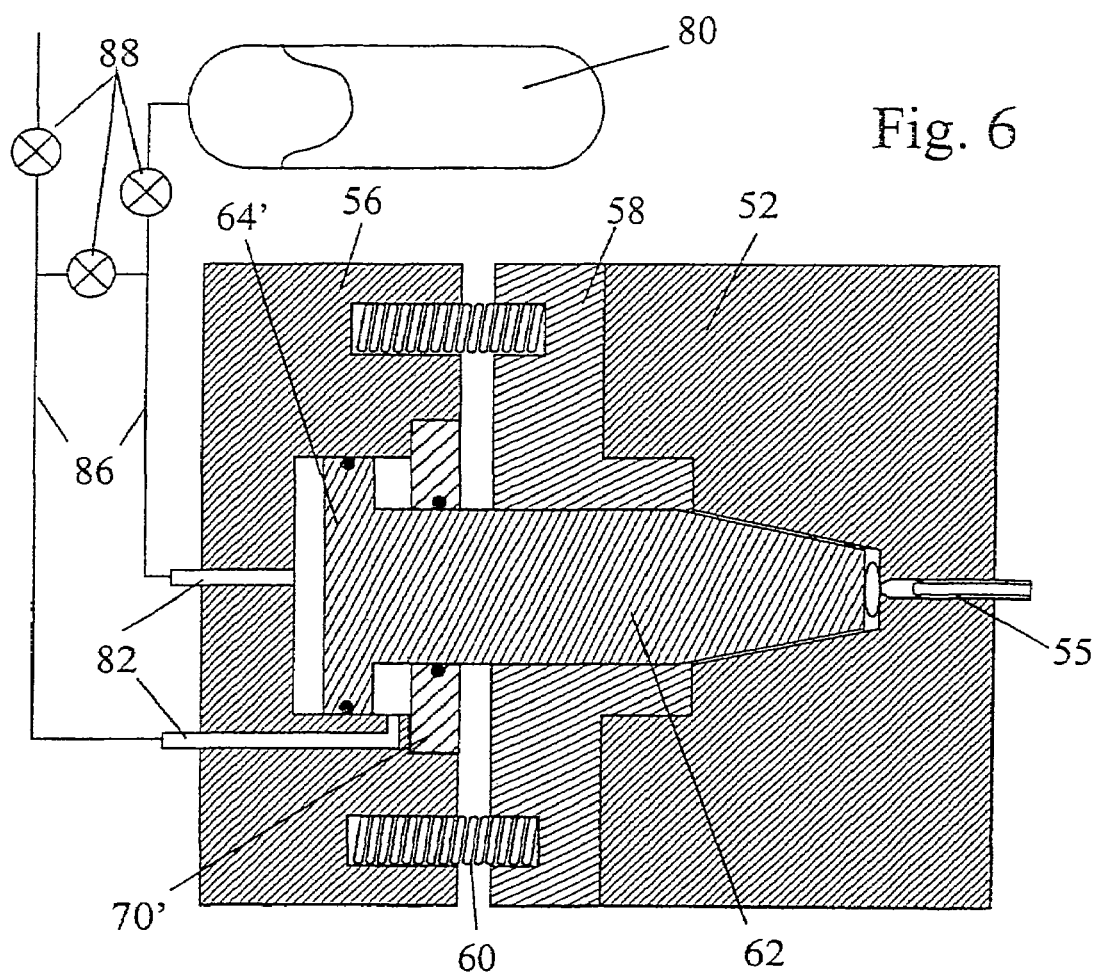
Figure 7:
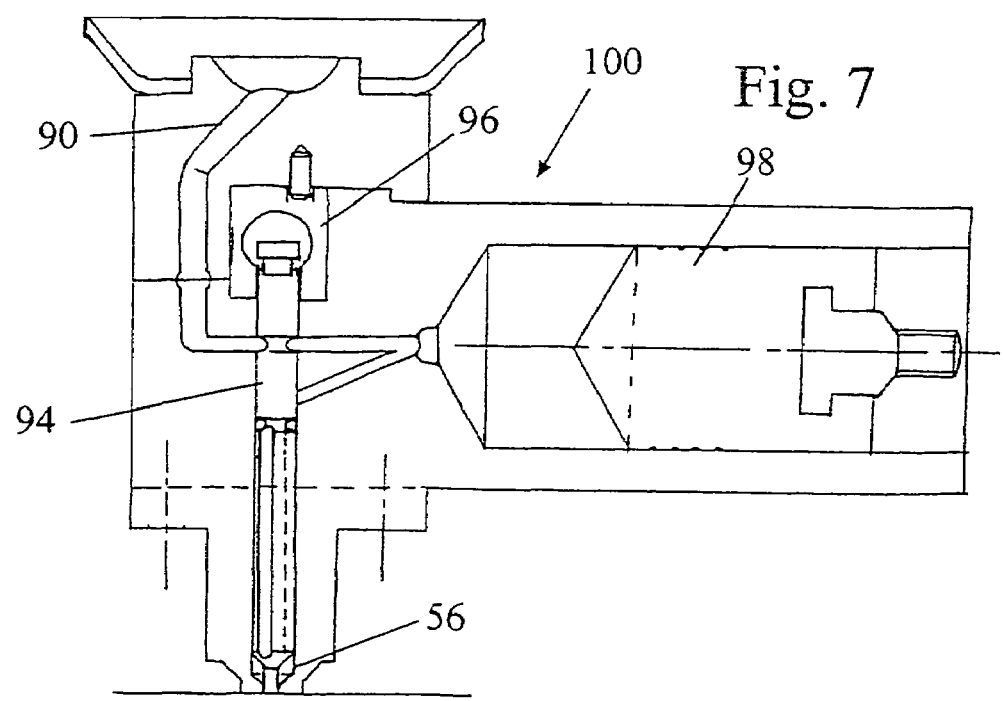

FIG. 3 is a section through the mould of FIG. 1 immediately prior to injection of the plastics melt, FIG. 4 is a section through the mould of FIG. 1 during the injection of the plastics melt, FIG. 5 is a section through the mould of the preceding Figures with the mould cavity fully closed, FIG. 6 is a view similar to that of FIG. 3 showing an alternative embodiment of the mould that uses an accumulator in place of a coil spring, and FIG. 7 is a schematic section through part of a hot runner manifold showing one of the dosing cylinders used to ensure that all the cavities receive an equal quantity of plastics melt when using a multiple cavity mould connected to a common feed screw.

DETAILED DESCRIPTION OF AN EMBODIMENT

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

The moulding machine shown in FIG. 1 is generally conventional and will therefore only be described in the detail necessary to understand the Injection Impact Compression (IIC) method of the invention. The moulding machine 10 comprises two stationary bulkheads 12 and 14 connected to one another by four tie bars 16. A convention mould 18 is shown which is formed of two parts, namely a stationary part 18a mounted on the bulkhead 12 and a movable parts 18b mounted on a platen 20 that can slide along the tie bars 16. The platen 20 is moved towards and away from the bulkhead 12 by a hydraulic ram 22 that is mounted on the bulkhead 14 and is connected to the platen 20 by a toggle mechanism which comprises levers 24a pivoted on the bulkhead 14, levers 24b pivoted on the platen 20 and levers 24c pivoted on the ram 22, the other ends of all three levers 24a, 24b and 24c being pivoted to another. The levers of the toggle mechanism are shown in their position when the mould cavity is open and to close the mould cavity, the ram moves to the right as viewed so that the levers 24c move into a more vertical position and acts on the levers 24a and 24b to move them into alignment with one another, thus moving the platen 20 and the mould part 18 towards the closed position.

A heated screw feed mechanism 30 heats and compresses granules drawn from a hopper by rotation of the screw to form a plastics melt and the screw can also be moved axially to inject the melt into the mould cavity through a set of runners.

As earlier indicated, the machine of FIG. 1 is already known for injection moulding. Conventionally, the mould cavity is closed and the injection screw is advanced to provide all the necessary pressure to inject sufficient melt to fill the cavity. After the plastics material has set in the mould, it is opened, the formed article is ejected and a new cycle is commenced.

This known method of operation has its limitation and cannot be used to form articles that have a very thin wall section. This is because as the plastics material is injected, it cools very rapidly on contact with the mould surface and creates a large back pressure that prevents the plastics material from filling the entire cavity.

In the present invention, the injection screw is not relied upon to produce enough pressure to fill a closed mould cavity. Instead, the screw is used to inject a dose of the melt into the mould while the mould cavity is not closed under pressure and subsequently the mould parts are brought together rapidly using the ram 22 to "forge" the plastics material and force it rapidly to fill every part of the mould cavity.

An operating cycle will now be considered into greater detail with reference to FIGS. 2 to 5.

In place of a conventional two part mould 18a, 18b as described by reference to FIG. 1, the preferred embodiment of the invention uses a mould assembly 50 comprising four components that can move relative to one another. The first of the four components is a stationary cavity assembly 52 that defines the cavity 54 and is formed with a feed gate 56 through which the plastics melt is injected into the cavity. The cavity assembly is fixed to the bulkhead 12. The feed gate 56 and the control pin that opens and closes the gate will be described in more detail below in the context of the manner of introducing an accurate dose of the plastics melt into the mould cavity 54.

The other three components, which together constitute the core assembly, are mounted on the moving platen 20 of the moulding machine. A first of the three components, herein termed the pressure plate, is designated and is fixed to the moving platen 20. The second of the components is termed a rim closure plate and is designated 58 in the drawings. The rim closure plate is biased away from the pressure plate 56 by relatively strong springs 60 and is accurately aligned and guided so that a projecting boss 59 engages in a recess 53 in the mould part 52 of the cavity assembly. The last of the components of the mould is a core 62 which partly defines the mould cavity and has a cylindrical portion that slides freely through and is accurately guided within a through bore formed in the rim closure plate 58.

The core 62 at its end remote from the mould cavity is formed with an enlarged head 64 that is received in the manner of a piston in a chamber 66 formed in the pressure plate 56. A weak spring located in the chamber 66 urges the core away from the pressure plate towards annular stop plate 70 that is fixed to the pressure plate 56 and surrounds the cylindrical region of the core 62. The enlarged head 64 trapped between the pressure plate 56 and the stop plate 70 forms a lost motion coupling arranged in the line of action between the core 62 and the machine platen 20.

Figure 2:
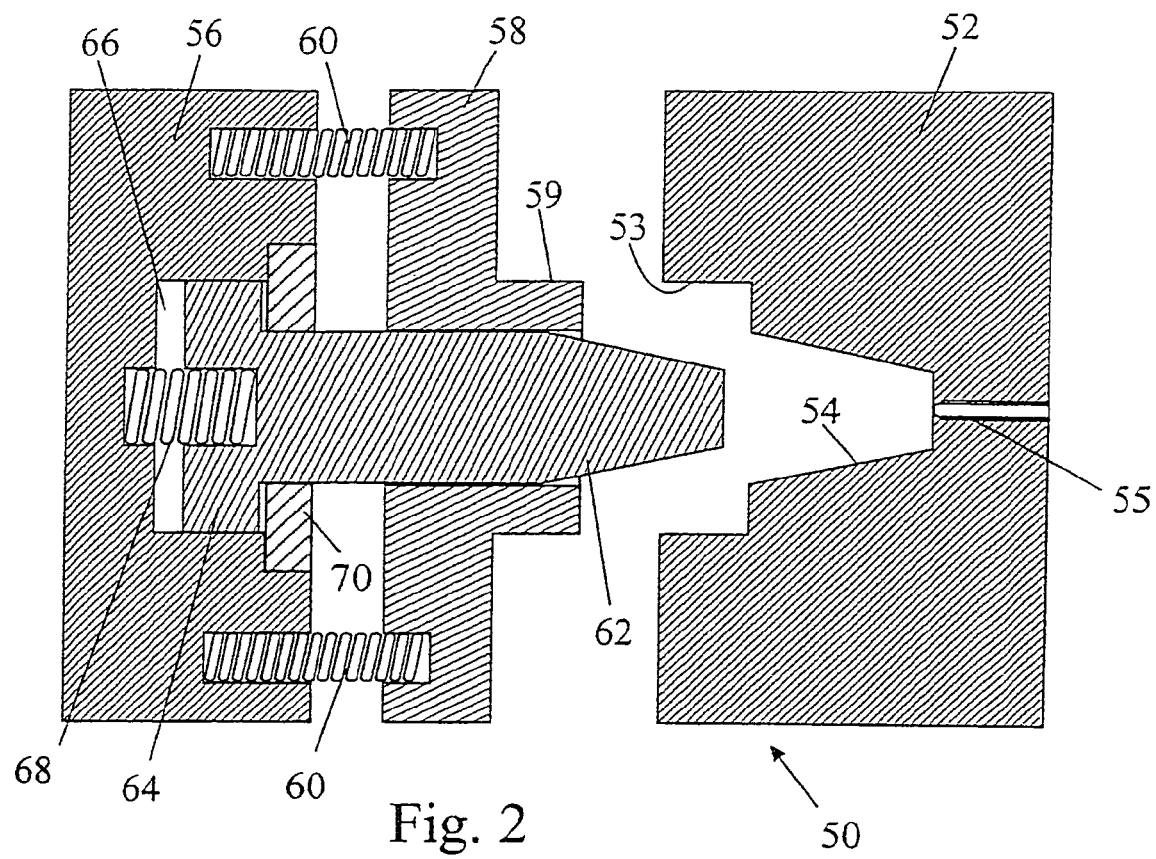
FIG. 2 is a section through a mould when fully open.

In the embodiment of FIGS. 2 to 4, that the head 64 does not form a seal with the chamber 66 and the stop plate 70 does not seal against the core 62. Instead, small clearances allow air to escape while damping the movement of the core 62.

FIG. 2 shows the mould in the position at the end of one cycle and the commencement of the next. The cavity is open and the formed article, in this case a drinking cup, is ejected from the cavity in a conventional manner (not shown). The toggle mechanism now moves the core assembly towards the cavity assembly until the position shown in FIG. 3 is reached or at least nearly reached. In this position the boss 59 of the rim closure plate 58 is fully engaged in the recess 53 of the cavity assembly 52 and the strong springs 60 ensure the cavity is fully contained against the egress of plastics melt from the mould cavity even though the core can still move to allow the cavity volume to vary.

In the next step, plastics melts is introduced at relatively low pressure into the mould cavity through the feed gate 56. At this point, the pressure of injection of the plastics melt can push the core 62 back against the action of the weak spring 68. The injection can be timed to occur just before or just after the core reaches the bottom of the cavity 54 so that as the melt enters the cavity it spreads into the corners of the cavity without trapping any gas between the melt and the corners of the mould. The injection pressure is not however sufficient to force the plastics melt into the narrow parts of the mould cavity, in this case the conical wall of the drinking cup.

Lastly, the pressure plate 56 is moved by the platen 20 to apply a force directly to the core 62 after full compression of the weak spring 68. The pressure resulting from the movement of the core under the force of the hydraulic ram 22 as magnified by the mechanical advantage of the toggle levers is sufficiently great to forge the melt and thereby fill all parts of the mould.

The term "forge" is used in order to stress the speed of closing the mould and the rate of pressure increase within the mould cavity during the closing process. Typically, the mould is closed and maximum pressure is reached within the cavity within a period of less than 0.5 seconds and preferably less than 0.3 seconds. By contrast, in prior art injection compression moulding, after the plastics material has been injected under pressure to fill a major part of the mould and cavity, the pressure is only ramped up progressively to flow the plastics material to fill the remainder of the mould.

The embodiment of FIG. 6 differs from the previously described embodiment only in that a gas spring or accumulator 80 is used in place of the coil spring 68. In this case, as represented by O-rings in the drawing, the head 64' of the core 62 does seal against the wall of the chamber 66 and the stop plate 70' seals against core 62. The two working chambers on opposite sides of the head 64' are connected through passages 82 formed in the pressure plate 56 and through external lines 86 and various valves 88 to the accumulator 80 and to atmosphere. The function is entirely analogous to that of a coil spring 68 in that the core 62 can move against weak resistance when the melt is injected into the cavity but the full force of the pressure plate 56 and the platen 20 acts on the core 62 when the core assembly reaches the end of its travel. It is important to note to those of average skill in the art that other mechanical and electromechanical means for moving the core 62 are within the true scope of spirit of the present invention.

When plastics material is normally injected into a mould having multiple cavities, the melt follows the path of least resistance. Thus the melt will first flow to the cavity nearest the feed screw and as that cavity fills its resistance increases so that the melt flows to the other cavities, this being repeated until all the cavities are full. Such an approach cannot be used in the present invention because the melt always meets little resistance even after a cavity has received its full dose of plastics material. Relying on back pressure would result in all the plastics material flowing to the first cavity and none to the others.

To avoid this problem, the preferred embodiment of the invention uses a special hot runner system, shown in FIG. 7, to distribute the plastics material to the individual cavities. As with all hot runner systems, the manifold 100 has a single inlet 90 which is connected to the screw and several outlets each constituted by the feed gate 56 of a respective cavity. Control pins 94 that open and close the feed gates are all actuated by a common slider 96 that moves in and out of the plane of the drawing.

The control pins also act as spool valves. In particular, in one of their end positions, the control pins 94 allow plastics material to flow from the inlet 90 to the working chamber 102 of a dosing cylinder 98 associated with a respective mould cavity. During this time, the mould cavity is closed. In their other end positions, the control pins open the feed gate, isolate the dosing cylinder 98 from the inlet 90 and connect it instead to the feed gate. When the piston is now moved, it injects the quantity of the plastics melt contained in the working chamber 102 into its associated mould cavity. By adjusting a stop that limits the stroke of each piston, the quantity of plastics material injected into each cavity can be accurately and separately metered.

The pistons of the dosing cylinders 98 can be actuated by an independent mechanical, electrical or hydraulic mechanism but it is alternatively possible to arrange for the pistons to be mounted parallel to the axis of relative movement of the components of the mould so that the force for injecting the plastics melt into the cavities may be derived from the movement of platen 20. In particular, the pistons may be actuated by the rim closure plate 58.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method of injection compression moulding a thin walled article using a mould, the method comprising:
   mounting a core, surrounded by a rim closure part, on a pressure plate so that the core is movable separately from the rim closure part and separately from the pressure plate in a direction of opening and closing of a mould;
   moving the pressure plate relative to a first mould part between a first end position and a second end position in which the mould is respectively opened and closed, wherein the first mould part, the core and the rim closure define a mould cavity having a thin walled portion;
   injecting a predetermined dose of molten material into the mould cavity; and
   applying a force to urge the core away from the pressure plate towards a position of minimum mould cavity volume while molten material is being injected into the mould cavity, the force being such as to permit the mould cavity volume to be increased by injecting the molten material and such that upon termination of the injection of the molten material into the mould cavity, the mould cavity is only partially filled therewith, the thin walled portion of the mould cavity remaining unfilled;
   wherein, prior to reaching the second end position, the pressure plate makes direct contact with the core to reduce the mould cavity to its minimum volume, a compression force being directly applied to the core as the pressure plate is moved towards the second end position to cause the molten material to flow so as to fill the mould cavity entirely including the thin walled portion.

2. A mould for mounting between two platens of an injection moulding machine for injection compression, the mould comprising:
   a first mould part;
   a pressure plate movable relative to the first mould part between a first end position and a second end position in which the mould is respectively opened and closed;
   a core supported by the pressure plate and movable relative to the pressure plate in a direction of opening and closing of the mould;
   a rim closure part surrounding and in sealing engagement with the core and arranged between the first mould part and the pressure plate, the first mould part, the core and the rim closure part together defining a mould cavity having a thin walled portion and each being movable relative to the other two in the direction of opening and closing of the mould;
   a dosing cylinder associated with the mould cavity for injecting a predetermined dose of molten material into the mould cavity; and
   means for applying a force to urge the core away from the pressure plate towards a position of minimum mould cavity volume while molten material is being injected into the mould cavity, the force being such as to permit the mould cavity volume to be increased by the injecting of the molten material and such that upon termination of the injection of the molten material into the mould cavity, the mould cavity is only partially filled therewith, the thin walled portion of the mould cavity remaining unfilled;
   wherein, prior to reaching the second end position, the pressure plate makes direct contact with the core to reduce the mould cavity to its minimum volume, a compression force being directly applied by the pressure plate to the core as the pressure plate is moved towards the second end position to cause the molten material to flow so as to fill the mould cavity entirely including the thin walled portion.

3. The mould as claimed in claim 2, further comprising:
   means for aligning the rim closure part relative to the first mould part in order to achieve accurate alignment of the core in relation to a remainder of the mould cavity.

4. The mould as claimed in claim 2, wherein the means for applying a force to the core includes at least one of:
   a spring;
   a hydraulic actuator; and
   a motor;
   for resisting retraction of the core into the pressure plate.

5. The mould as claimed in claim 3, wherein the means for applying a force to the core includes at least one of:
   a spring;
   an air cylinder:
   a hydraulic actuator; and
   a motor;
   for urging the core away from the pressure plate.

6. The mould as claimed in claim 2, wherein the means for applying a force to the core includes a damping means resisting retraction of the core into the pressure plate.

7. The mould as claimed in claim 5, wherein the means for applying a force to the core includes a damping means resisting retraction of the core into the pressure plate.

8. The mould as claimed in claim 2, wherein means are provided for resiliently urging the rim closure part away from the pressure plate towards the first mould part.

9. The mould as claimed in claim 5, wherein means are provided for resiliently urging the rim closure part away from the pressure plate towards the first mould part.

10. The mould as claimed in claim 7, wherein means are provided for resiliently urging the rim closure part away from the pressure plate towards the first mould part.

11. A mould as claimed in claim 2, wherein the mould is formed with multiple mould cavities and wherein a dosing cylinder is associated with each mould cavity and is arranged within the first mould part to inject a predetermined dose of the molten material into the associated mould cavity.

12. A mould as claimed in claim 5, wherein the mould is formed with multiple mould cavities and wherein a dosing cylinder is associated with each mould cavity and is arranged within the first mould part to inject a predetermined dose of the molten material into the associated mould cavity.

13. A mould as claimed in claim 10, wherein the mould is formed with multiple mould cavities and wherein a dosing cylinder is associated with each mould cavity and is arranged within the first mould part to inject a predetermined dose of the molten material into the associated mould cavity.

14. A mould as claimed in claim 11, wherein each dosing cylinder includes a piston reciprocable within a cylinder and wherein the piston is moved in the cylinder by an action of the platen in the direction to eject the dose of molten material from the cylinder into the associated mould cavity.

15. A mould as claimed in claim 12, wherein each dosing cylinder includes a piston reciprocable within a cylinder and wherein the piston is moved in the cylinder by the action of the platen in the direction to eject the dose of molten material from the cylinder into the associated mould cavity.

16. A mould as claimed in claim 13, wherein each dosing cylinder includes a piston reciprocable within a cylinder and wherein the piston is moved in the cylinder by the action of the platen in the direction to eject the dose of molten material from the cylinder into the associated cavity.

17. The mould as claimed in claim 2, wherein the mould cavity further defines a base and a thin side walled portion and wherein upon termination of the injection of the molten material into the mould cavity only the base is filled with molten material leaving the thin side walled portion at least partially unfilled therewith, and when the pressure plate makes direct contact with the core to reduce the mould cavity to its minimum volume, the molten material to flow so as to fill the mould cavity entirely including the thin side walled portion.

18. An injection moulding machine for injection compression moulding, the moulding machine comprising:
 a first mould part;
 a pressure plate movable relative to the first mould part between a first end position and a second end position in which the mould is respectively opened and closed;
 a core supported by the pressure plate and movable relative to the pressure plate in a direction of opening and closing of the mould, the first mould part, the core, and the pressure plate together defining a mould cavity having a thin walled portion;
 a dosing cylinder for injecting a predetermined dose of molten material into the mould cavity;
 an actuator placed between the pressure plate and the core for applying a force to urge the core away from the pressure plate towards a position of minimum mould cavity volume while molten material is being Injected into the mould cavity, the force being such as to permit the mould cavity volume to be increased by the injecting of the molten material and such that upon termination of the injection of the molten material into the mould cavity, the mould cavity is only partially filled therewith, the thin walled portion of the mould cavity remaining unfilled;
 wherein, prior to reaching the second end position, the pressure plate makes direct contact with the core to reduce the mould cavity to its minimum volume, a compression force being directly applied to the core as the pressure plate is moved towards the second end position to cause the molten material to flow so as to fill the mould cavity entirely including the thin walled portion.

19. The injection moulding machine as claimed in claim 18, wherein the actuator for applying a force to the core includes at least one of:
 a spring;
 an air cylinder:
 a hydraulic actuator;
 a motor;
for urging the core away from the pressure plate.

20. The injection moulding machine as claimed in claim 18, wherein the actuator for applying a force to the core includes a damping means resisting retraction of the core into the pressure plate.

21. The injection moulding machine as claimed in claim 18, wherein the mould is formed with multiple mould cavities and wherein a dosing cylinder is associated with each mould cavity and is arranged within the first mould part to inject a predetermined dose of the molten material into the associated mould cavity.

* * * * *